US 12,449,888 B2

United States Patent
Yi et al.

(10) Patent No.: US 12,449,888 B2
(45) Date of Patent: Oct. 21, 2025

(54) TECHNIQUE FOR IMPROVING POWER STATE TRANSITION LATENCY FOR COMPUTING DEVICE

(71) Applicant: Advanced Micro Devices, Inc., Santa Clara, CA (US)

(72) Inventors: Donny Yi, Austin, TX (US); Karthik Rao, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 136 days.

(21) Appl. No.: 18/080,582

(22) Filed: Dec. 13, 2022

(65) Prior Publication Data

US 2024/0192760 A1 Jun. 13, 2024

(51) Int. Cl.
G06F 1/32 (2019.01)
G06F 1/3296 (2019.01)

(52) U.S. Cl.
CPC ................... *G06F 1/3296* (2013.01)

(58) Field of Classification Search
CPC ....................................... G06F 1/3296
See application file for complete search history.

(56) References Cited

U.S. PATENT DOCUMENTS

| 2006/0069870 | A1 | 3/2006 | Nicholson et al. | |
|---|---|---|---|---|
| 2007/0014177 | A1* | 1/2007 | Jeong ..................... | G11C 5/143 365/226 |
| 2007/0094519 | A1* | 4/2007 | Yamamoto ............ | G06F 1/3203 713/300 |
| 2008/0037979 | A1* | 2/2008 | Guthrie .................... | G03B 7/26 396/205 |
| 2011/0187753 | A1* | 8/2011 | Watanabe ................ | H02J 7/35 315/307 |
| 2012/0166852 | A1* | 6/2012 | Sodhi .................... | G06F 1/3287 713/324 |
| 2014/0181552 | A1 | 6/2014 | Andreoli et al. | |
| 2014/0189401 | A1 | 7/2014 | Keppel et al. | |
| 2015/0121057 | A1 | 4/2015 | Arora et al. | |
| 2015/0198991 | A1 | 7/2015 | Bircher | |
| 2015/0248935 | A1 | 9/2015 | Moshayedi et al. | |
| 2017/0228196 | A1 | 8/2017 | Alavoine et al. | |
| 2017/0308442 | A1 | 10/2017 | Bolt et al. | |
| 2018/0253131 | A1 | 9/2018 | Heinrich et al. | |
| 2018/0356868 | A1 | 12/2018 | Keceli et al. | |
| 2019/0317591 | A1 | 10/2019 | Sanghi et al. | |
| 2020/0042207 | A1 | 2/2020 | Kwak et al. | |
| 2022/0317757 | A1 | 10/2022 | Rao et al. | |

FOREIGN PATENT DOCUMENTS

WO 2011120019 A2 9/2011

* cited by examiner

*Primary Examiner* — Stefan Stoynov
(74) *Attorney, Agent, or Firm* — Volpe Koenig (57) ABSTRACT

A disclosed technique includes in response to a trigger to power a functional element of a device to a lower power state, operating a set of backup state elements for the functional element in a lower power mode; and resuming operation of the functional element and the backup state elements in a higher power state.

20 Claims, 5 Drawing Sheets

TECHNIQUE FOR IMPROVING POWER STATE TRANSITION LATENCY FOR COMPUTING DEVICE

BACKGROUND

Computing hardware consumes a large amount of power. Mobile devices that rely on batteries to supply this power benefit from power reduction in terms of increased operating duration. Power consumption concerns are thus a perpetual area for improvement for computing hardware.

BRIEF DESCRIPTION OF THE DRAWINGS

A more detailed understanding can be had from the following description, given by way of example in conjunction with the accompanying drawings wherein.

DETAILED DESCRIPTION

A disclosed technique includes in response to a trigger to power a functional element of a device to a lower power state, operating a set of backup state elements for the functional element in a lower power mode; and resuming operation of the functional element and the backup state elements in a higher power state.

Figure 1:
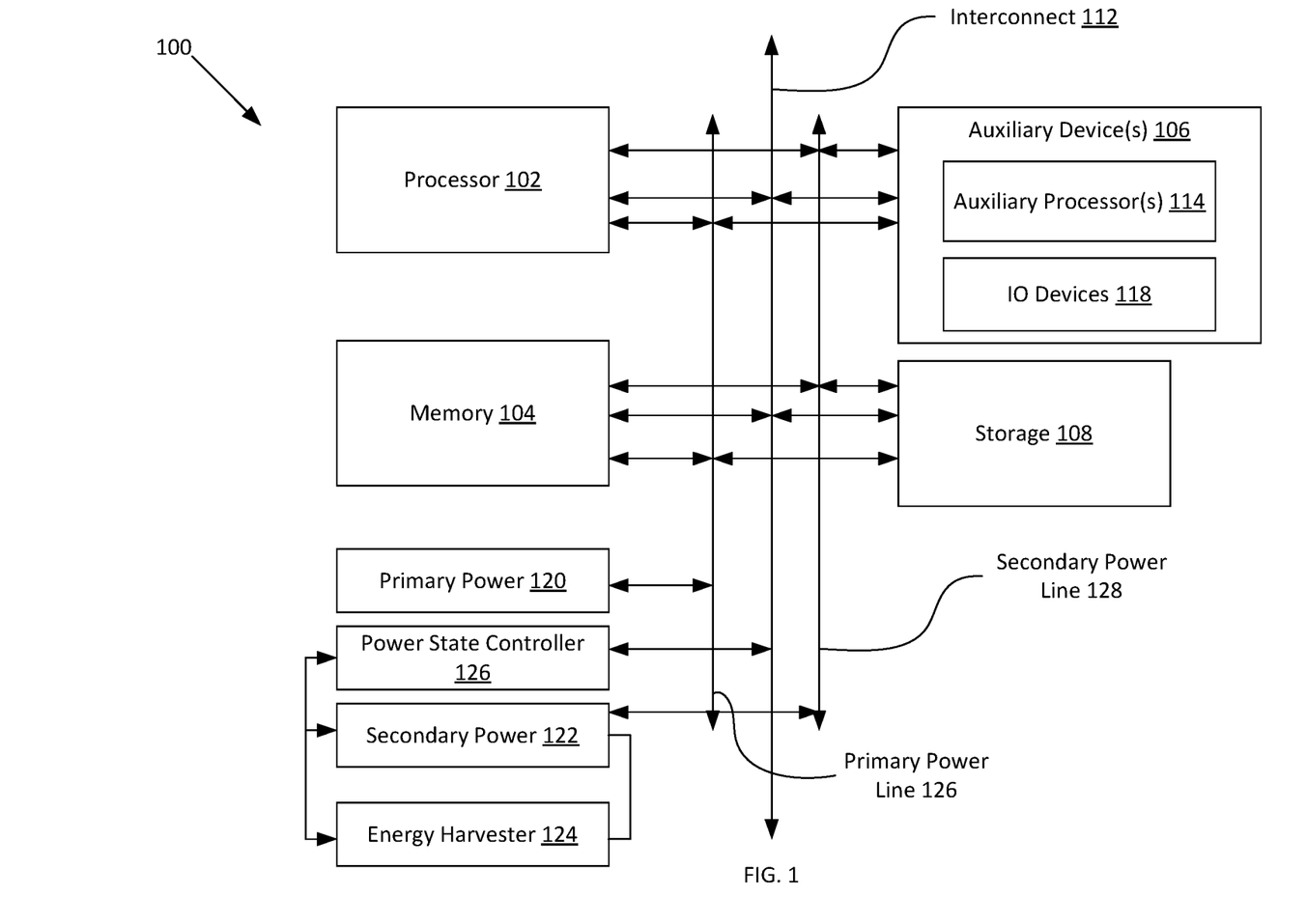
FIG. 1 is a block diagram of an example device in which one or more features of the disclosure can be implemented.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106, a storage 108, a primary power source 120, a secondary power source 122, and an energy harvester 124. An interconnect 112, which can be a bus, a combination of buses, and/or any other communication component, communicatively links the one or more processors 102, the memory 104, the one or more auxiliary devices 106, and the storage 108. The device 100 also includes a power state controller 126 coupled to the interconnect 112.

In various alternatives, the one or more processors 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The one or more auxiliary devices 106 include, without limitation, one or more auxiliary processors 114, and/or one or more input/output ("IO") devices 118. The auxiliary processors 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor.

The one or more IO devices 118 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display, a speaker, a printer, a haptic feedback device, one or more lights, an antenna, or a network connection (e.g., a wireless local area network card for transmission and/or reception of wireless IEEE 802 signals).

A power state controller 126 controls power states of the various elements of the device 100. Such controlled elements include any combination of the processor 102, the memory 104, any or all of the auxiliary devices 106, and the storage 108, and can include any elements not shown. Controlling power states includes increasing or decreasing the power state of any or all such elements. There may be many power states, and power states differ in many ways. Some example ways in which power states differ include the following: different clock rate for one or more components, different voltage for one or more components, different components powered up or down. In some examples, a higher power state has a higher total power draw than in a lower power state. In some examples, in the higher power state, at least a portion of the device has backup state elements and non-backup state elements powered on and in the lower power state, the at least the portion of the device has backup state elements powered on and no non-backup state elements powered on.

In some situations, when a portion of the device 100 is to be powered down, state data for that portion needs to be saved so that, when that portion of the device 100 is again powered up, that state data can be restored. In various examples, state data includes data stored in registers or memory locations that is required for operation of that portion of the device. In some examples, the portion of the device is an IO device 118 and the state is embodied as registers that control operation of the IO device 118 and/or registers that store status information about the IO device 118. In some such examples, if the IO device 118 were to be powered down without saving such state data, then the IO device 118 would not be able to operate correctly after the IO device 118 were again powered up. Thus, in some such examples, the power state controller 126 causes state data for a portion of the device 100 to be saved into a backup memory (such as in memory 104 or in another memory such as a memory of the IO device or a different memory) when the power state controller 126 powers the device 100 down. It should be noted that various portions of the device 100 have a large number of different memories, registers, or other components that store data (collectively, state memories). When such a portion is powered down, it is not always necessary to save all such data. Instead, portions of the device include state memories that store data that should be saved and other state memories that store data that does not need to be saved.

In some situations, it can be advantageous to power a portion of the device 100 down without having to save data for that portion of the device 100. The advantage for this scheme is gained through reduction in latency for changing power states. Specifically, because saving data takes time, eliminating the need to save state reduces latency of transition of power states. To remove the necessity to save such data, the state memories storing such data can be separately powered on while the rest of such portion of the device is powered down. In an example, when an IO device 118 is to be powered down, and that IO device 118 has state memories that store data that needs to be retained, the state memories storing such data can remain powered on while the remainder of that IO device 118 is powered down. Maintaining such state memories in a powered on state removes the requirement to save the state data into a backup memory such as the memory 104.

In addition to the above, devices 100 typically dissipate energy in a non-useful manner. For example, devices 100 typically generate heat that serves no useful function for the device 100. It is possible to harvest such heat as energy that can then be used to power the state memories for a portion of the device 100, for the time period in which that portion is powered down. Thus, energy which would otherwise not be used is able to be used to remove the necessity for saving state data to a backup memory.

Mechanisms are provided herein to allow for such state memories to remain powered on while the remainder of the portion of the device 100 serviced by such state memories is powered down, while also taking advantage of energy that would otherwise be uselessly dissipated into the environment.

A primary power source 120 provides power for all of the components of the device 100 via a primary power line 126. A secondary power source 122 provides power for the various state memories within the device 100 that store state data while respective device portions are powered down. State memories that store state data that would need to be saved are referred to herein sometimes as backup state memories or backup state elements. Power for portions of the device 100 that include backup state memories is controlled by the power state controller 126. These portions include both the portions that do not include the backup state memories as well as the backup state memories. Further, the backup state memories themselves have a connection, through the secondary power line 128, to the secondary power controller 122. In some examples, a power multiplexer (not shown) selects either the primary power source 120 or the secondary power source to power the backup state memories.

In some instances or examples, when the power state controller 126 instructs a portion of the device 100 to power down, and that portion includes backup state memories, the power state controller 126 causes the portion other than the backup state memories to power down. The power state controller 126 also causes the secondary power source 122 to power the backup state memories, preventing those memories from powering down. This action removes the need to save the data from the backup state memories to the memory.

The energy harvester 124 operates continuously or in any technically feasible time period. The energy harvester 124 collects ambient energy (e.g., thermal energy), converts that energy to electrical energy, and stores that energy in the secondary power source 122. In some examples, the energy harvester 124 is a thermal energy harvester that harvests thermal energy generated by the device 100. In some such examples, while the device 100 is operating, the energy harvest 124 harvests thermal energy from the device 100 and charges the secondary power source 122 with the harvested energy. In some examples, the energy harvester 124 includes thermocouples that are in thermal contact with one or more heat sinks of the device 100. In some examples, the energy harvester 124 includes one or more types of energy harvester other than a thermal energy harvest. In various examples, the energy harvester 124 includes a mechanical energy harvester configured to harvest energy from a keyboard, a kinetic energy harvester configured to harvest energy from a gyroscope or a rotor of the device 100, a solar cell configured to harvest ambient light energy, or other types of harvesters.

When the device 100 powers down one or more elements that have backup state memories, the secondary power source 122 powers the backup state memories so that the device 100 does not need to transfer the contents of the backup state memories to a different memory (e.g., memory 104). When the device 100 powers up those elements again, the primary power source 120 again powers the backup state memories. The backup state memories were not powered down despite the fact that the power state of the device 100 changed. Further, the energy that was used to power the backup state memories while the power state of the device 100 changed was provided by energy that would have been dissipated uselessly. Thus in this mode of operation, the device 100 reduces power down latency with minimal taxing of the primary power supply 120.

Figure 2:
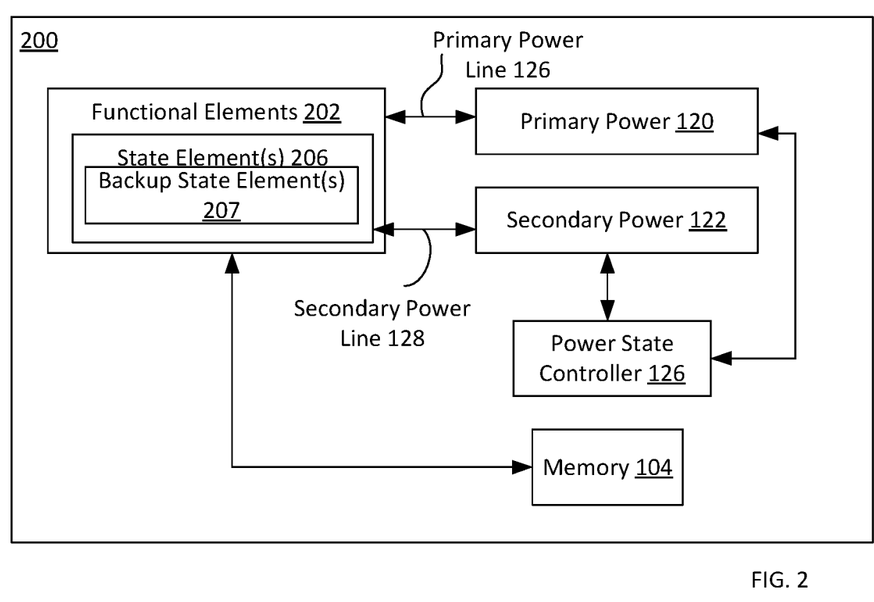
FIG. 2 illustrates a device that is an example implementation of the device of FIG. 1.

FIG. 2 is a block diagram of a device 200, according to an example. The device 200 is an example of the device 100 of FIG. 1. The device 200 includes a plurality of functional elements 202, a primary power source 120, a secondary power controller 122, a power state controller, and a memory 104. The primary power source 120, secondary power source 122, power state controller 126, and memory 104 correspond to the same elements in FIG. 1. The functional elements 202 represent portions of the device 100 that have state elements 206, including backup state elements 207. In various examples, the functional elements 202 include the processor 102, the memory 104, the storage 108, any of the IO devices 118, any of the auxiliary processors 114, one or more devices not shown, or one or more portions of any of the above.

A single functional element 202 that includes backup state elements 207 can also have other state elements. Thus, functional elements 202 are shown with state elements 206 that include backup state elements 207. State elements 206 that are not included within backup state elements 207 do not store data that would need to be saved if powered off. Backup state elements 207 store data that does need to be saved if powered off.

Figure 3:
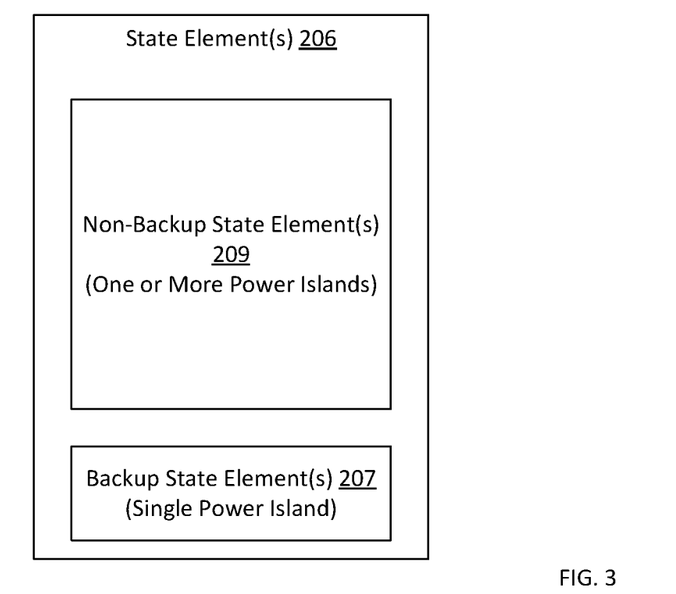
FIG. 3 illustrates state elements in greater detail, according to an example.

FIG. 3 illustrates state elements 206 in greater detail, according to an example. The state elements 206 of FIG. 3 represent state elements of a single functional element 202. The aspects of FIG. 3 are applicable to any functional element 202 of the device 100.

In the example shown, the state elements 206 of a functional element 202 include non-backup state elements 209 and backup state elements 207. The non-backup state elements 209 store data that does not need to be saved even if the non-backup state elements 209 power down, and the backup state elements 207 store data that needs to be saved if the backup state elements 207 are powered down.

In some examples, the backup state elements 207 exist in the same power island. A power island is a portion of the device that is connected to the same power source. In this instance, the single power island of the backup state elements 207 is connected to a power rail that is coupled to the secondary power source 122. In some examples, the single power island of the backup state elements 207 is a physical area of the functional elements 202 where each of the backup state elements 207 have physical power connections to the power rail coupled to the secondary power source 122.

In some examples, the backup state elements 207 that belong to the same power island are not necessarily logically linked. For example, different backup state elements 207 can serve very different purposes. Thus, without the mechanism described herein, in which the backup state elements 207 can be powered separately from the non-backup state elements 209, the backup state elements 207 would not necessarily be located in the same physical area as each other. Instead, a layout for the state elements could be made in any manner. Often, such a layout depends on the uses for the backup state elements 207 as being associated with other non-backup state elements 209. In an example, without the mechanism described herein, backup state elements 207 would be interspersed with non-backup state elements 209, based on the actual uses for those state elements. The mechanism provided herein benefits from backup state elements 207 being physically close to each other in order to power all such backup state elements 207 for a given functional element 202 with the secondary power supply 122.

In some examples, registers of a functional element 202 that store data to be saved are not, themselves, included in a single power island. However, when the functional element 202 is to be powered down, the functional element 202 copies the data from those registers into a set of backup registers that are in a single power island. These backup registers are the backup state elements 207 and are powered on by the secondary power supply 122. In some examples, a power island is a portion of a power network (e.g., defined by conductive traces that supply power) having a common power rail. In some examples, elements of a power island are physically close together or adjacent and are coupled to the same power rail.

Figure 4A:
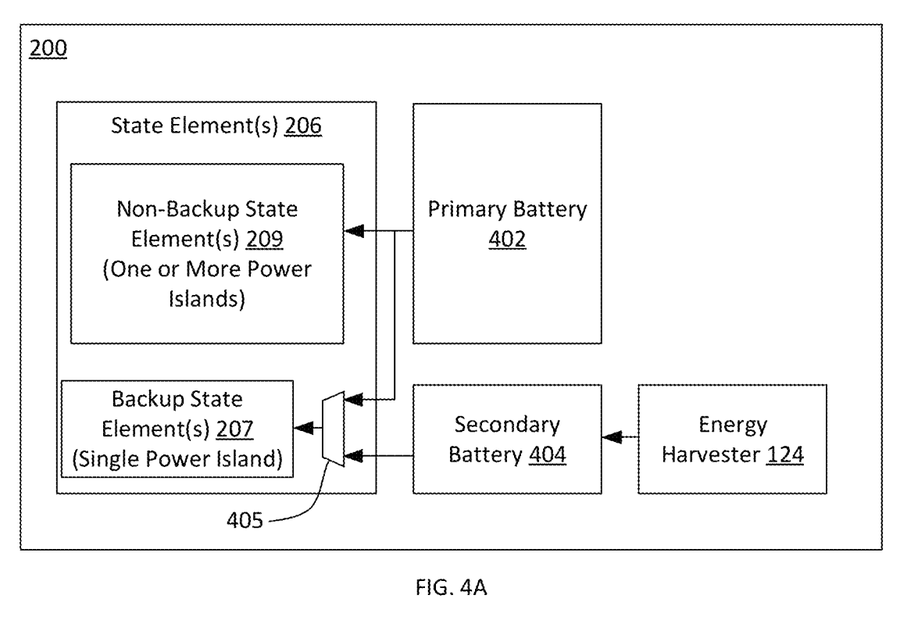
FIGS. 4A and 4B illustrate example power supply configurations.
Figure 4B:
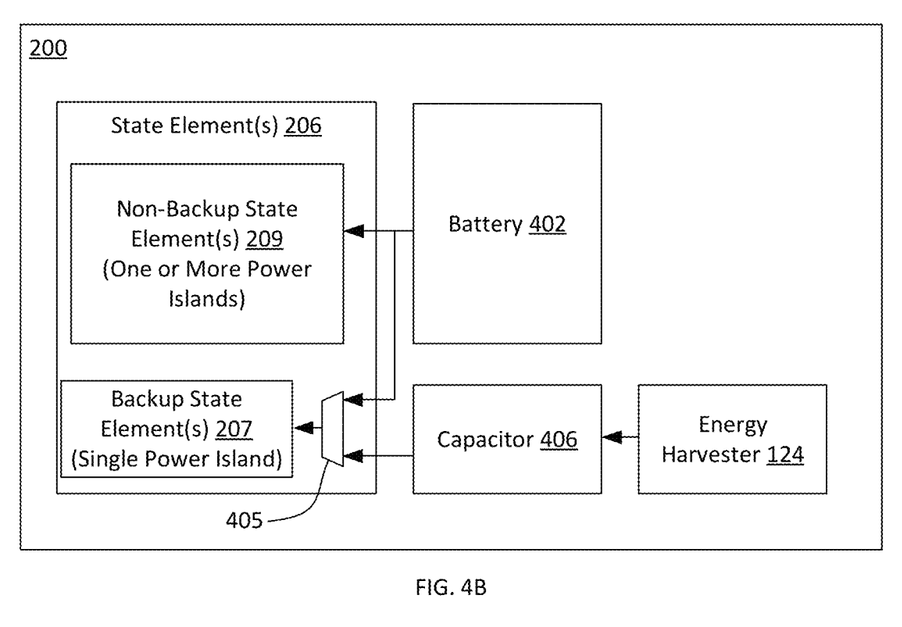

FIGS. 4A and 4B illustrate example power supply configurations. In FIG. 4A, the primary power supply 120 is a primary battery 402 and the secondary power supply 122 is a secondary battery 404. In some examples, the secondary battery 404 is charged by an energy harvester 124, such as a heat harvester. In some examples, the energy harvester 124 charges the secondary battery 404 during any feasible time period, such as when the primary battery 402 is powering both the non-backup state elements 209 and the backup state elements 207 and the secondary battery 404 is not charging any state element 206. It is alternatively possible for the energy harvester 124 to charge the secondary battery 404 while the secondary battery 404 is charging the backup state elements 207.

In various examples, the secondary battery 404 is a physically separate battery from the primary battery 402. In some examples, the secondary battery 404 is a different type of battery than the primary battery 402. In such examples, the secondary battery 404 is different than the primary battery 402 in one or more of the following ways: the secondary battery 404 has different capacity than the primary battery 402, the secondary battery 404 is in a different location than the primary battery 402, the secondary battery 404 uses a different battery technology than the primary battery 402, the secondary battery 404 has different electrical characteristics (e.g., output voltage, maximum current draw, or other characteristics) than the primary battery 402. A power multiplexor 405 selects between the primary battery 402 and the secondary battery 404.

FIG. 4B illustrates a configuration of the device 400(2) in which the primary power supply 120 is a battery 402 and the secondary power supply 122 is a capacitor 406. In some such examples, the capacitor 406 is charged by the energy harvester 124 when the battery 402 is powering the backup state elements 207. In some examples, the capacitor 406 is additionally charged by the energy harvester 124 when the capacitor 406 is powering the backup state elements 207.

In some examples, the capacitor 406 provides power to elements other than the backup state elements 207. In other examples, the capacitor 406 is dedicated to powering the backup state elements 207. In some examples, the capacitor retains some charge when elements such as non-backup state elements 209 and functional elements 202 are powered off. This charge can be used to power the backup state elements 207 when corresponding non-backup state elements 209 are powered down.

Although a capacitor and a battery have been described as implementations of the secondary power source 122, and that a battery has been described as an implementation of the primary power source 120, it should be understood that any power source could alternatively be used. In an example, the primary power source 120 could be wall power (e.g., connected to a power outlet in the wall), could be a solar power module, or could be any other power source.

A power multiplexor 405 selects between the battery 402 and the capacitor 406.

Figure 5:
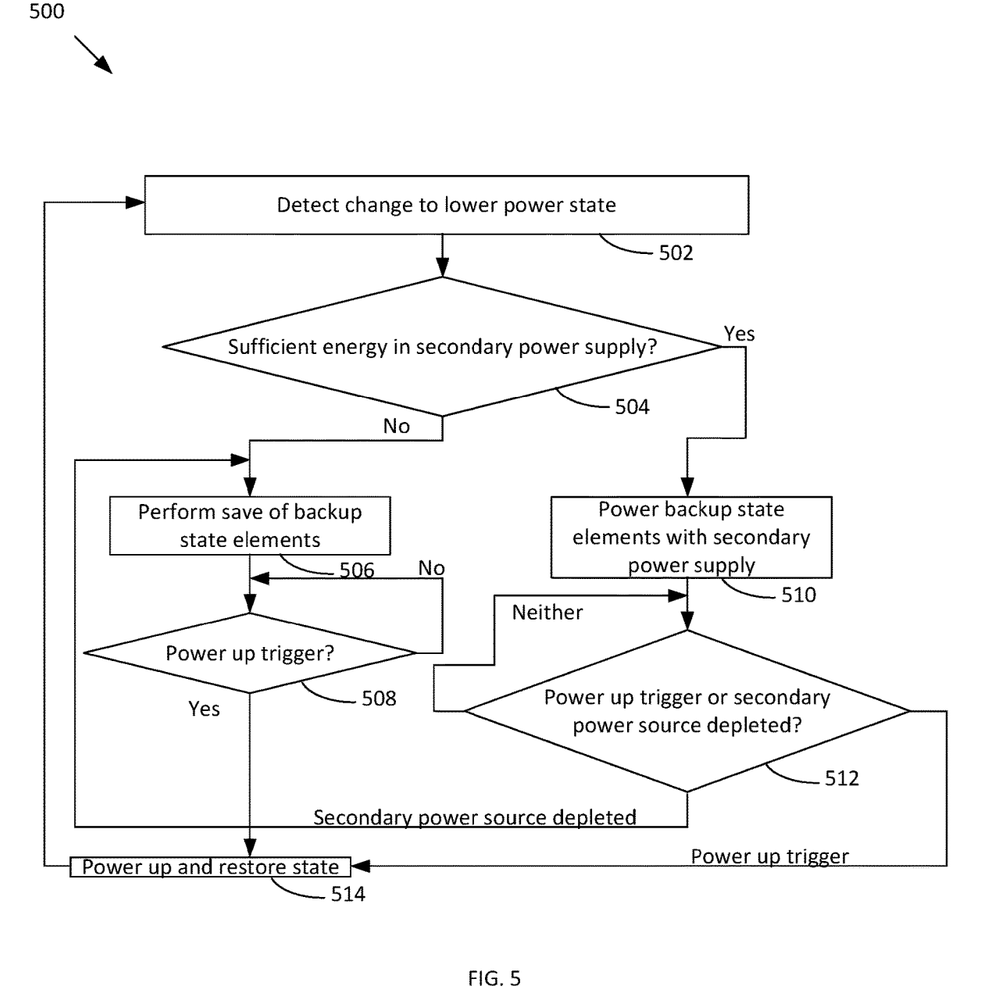
FIG. 5 is a flow diagram of a method for operating a device with backup save state elements, according to an example.

FIG. 5 is a flow diagram of a method 500 for operating a device with backup save state elements, according to an example. Although described with respect to the system of FIGS. 1-4, those of skill in the art will understand that any system, configured to perform the steps of the method 500 in any technically feasible order falls within the scope of the present disclosure.

At step 502, an element of the device 200 triggers a change to a lower power state. More specifically, the device 200 is operating in a state in which, for at least one functional element 202, both the backup state elements 207 and the non-backup state elements 209 are powered on. Subsequently, the device 200 triggers a change to a lower power state in which at least a portion of the functional element 202 is powered down. In various examples, an operating system or power state controller 126 causes the device 200 to power down to this lower power state.

In response to the trigger to enter the lower power state, the power state controller 126, at step 504, determines whether the secondary power supply 122 stores sufficient energy to power the backup state elements 209 while the device 200 is in the lower power state. If there is sufficient power, then the method 500 proceeds to step 510 and if there is not sufficient power, then the method 500 proceeds to step 506.

In some examples, the power state controller 126 determines whether the secondary power supply 126 has sufficient power for step 504 by predicting the length of time that the device 200 will remain in the lower power state and by predicting a rate or amount of power draw during the power down period. In such examples, the power state controller 126 compares the predicted energy usage as determined by combining the predicted lower power duration and the predicted rate or amount of power draw with the capacity of the secondary power supply 122. If the secondary power supply 122 has enough capacity to supply the predicted energy usage to the backup state elements 209 during the lower power state, then the device 200 determines that there is sufficient energy in the secondary power supply and if the secondary power supply 122 does not have enough capacity, then the device 200 determines that there is not sufficient energy. In some examples, in determining the amount of energy necessary to retain the backup state elements 209 in a powered up state, the power state controller 126 considers the amount of energy necessary to perform other operations related to the backup state elements 209 during that period.

At step 506, the power state controller 126 has determined that insufficient energy exists to power the backup state elements 209 during the power down period. Thus, the power state controller 126 causes the state in the backup state elements 209 to be saved to a backup memory such as memory 104. In addition, in some examples, step 506 also includes powering down the functional elements 202 and powering down the state elements 206. In some examples or modes of operation, the backup memory into which state is saved depends on the power state into which the device 200 is being placed. The power state determines which memories are powered up or powered down. In an example, one memory (e.g., a memory that is close to the functional element that is powered down) is used to store backup data in a first power state in which at least a portion of the device is powered down. In a second power state that is lower than the first power state, that memory is also powered down. Thus, that memory is not available to store the backup data. For this reason, in the second power state, the device 200 saves the backup data in a different memory such as system memory 104.

At step 508, the power state controller 126 determines whether there has been a power up trigger which would lead to the backup state elements 209 to be powered back on or, if powered by the secondary power supply 122 (see step 512), to be powered by the primary power supply 120 again. If such a trigger does not occur, then the method 500 returns to step 508. If such a trigger does occur, then the method 500 proceeds to step 514, restoring state to the powered down elements being powered back up, and returns to step 502.

Returning to step 510, in the event that there is sufficient energy in the secondary power supply 122 to power the backup state elements 209, the method 500 proceeds to step 510. At step 510, the secondary power supply 122 powers the backup state elements 209 while other portions of the device 200 are powered down or powered off. In some examples, this step includes powering down functional elements 202, reducing power of primary power supply 120 (e.g., power gating the primary power supply 120 or completely powering the primary power supply 120 down), as well as powering down the state elements 206 other than the backup state elements 207.

At step 512, the power state controller 126 determines whether there is a power up trigger or whether the secondary power source has been depleted. If neither has occurred, then no change has occurred and the method 500 returns to step 512. If a power up trigger has occurred, then the power state controller 126 powers the device 200 back up and causes the backup state elements 209 to be powered by the primary power supply 120 again (step 514). Upon detecting another change to the lower power state, the method returns to step 502, repeating the described operations.

If, at step 512, the power state controller 126 determines that the secondary power source is depleted, then the power state controller 126 performs step 506, causing the state from the backup state elements 209 to be saved into a backup memory. The method 500 proceeds as indicated and as described above after that.

Figure 6:
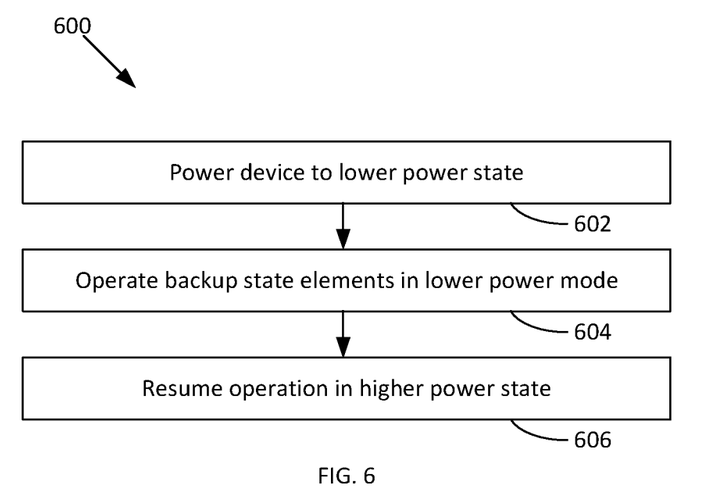
FIG. 6 is a flow diagram of a method for operating a device, according to an example.

FIG. 6 is a flow diagram of a method 600 for operating a device 200, according to an example. Although described with respect to the system of FIGS. 1-5, those of skill in the art will understand that any system, configured to perform the steps of the method 600 in any technically feasible order falls within the scope of the present disclosure.

At step 602, the device 200 powers to a lower power state. Step 602 may occur in response to a variety of events, such as an operating system determining that the device 200 should be in a lower power mode or for any other reason. In this lower power state, at least one functional element 202 is in a lower power mode. In this lower power mode, at least some of the state elements 206 are powered down. That functional element 202 includes one or more backup state elements 207 that store state for the functional element 202 that must be maintained, in some way, while the functional element 202 is powered down. As described elsewhere herein, maintaining that state may occur by maintaining power to the backup state elements 207 or by saving the data to a backup memory such as memory 104.

At step 604, the power state controller 126 operates the backup state elements 207 in a lower power mode. As described elsewhere herein, operating the backup state elements 207 in a lower power mode includes either maintaining power to the backup state elements via a secondary power supply 122 or backing up the data from the backup state elements 207 to a backup memory such as memory 104 and then powering those backup state elements 207 down. At described elsewhere, in some examples, the mode of operation depends on whether the secondary power supply 122 is determined or predicted to store enough energy to power the backup state elements 207 during the lower power period.

At step 606, the power state controller 126 resumes operation of the functional element 202 in the higher power state. In the higher power state, the backup state elements 207 are powered by the primary power supply 120. If the data of the backup state elements 207 was saved to a backup memory, transitioning to the higher power state includes restoring that data to the backup state elements 207. If the data remained in the backup state elements 207, transitioning to the higher power state includes powering the backup state elements 207 with the primary power supply 120 rather than the secondary power supply 122.

Note that in step 604, it is possible for the power state controller 126 to cause the backup state elements 207, powered by the secondary power supply 122, to be powered down. For example, if the secondary power supply 122 no longer has enough energy to power the backup state elements 207, then the power state controller 126 causes the data of the backup state elements 207 to be stored in a backup memory like the memory 104 and causes the backup state elements 207 to power down.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the auxiliary devices 106 (including the IO devices 118 and auxiliary processor 114), the power state controller 126, the state elements 206, and the functional elements 202) may be implemented as a hardware electronic circuit, a general purpose computer, a processor, or a processor core, as a program, software, or firmware, stored in a non-transitory computer readable medium or in another medium, executable by a general purpose computer, a processor, or a processor core, or as a combination of two or more of a processor, a circuit, or software. The interconnect 112, primary power line 125, and secondary power line 128 include any number of interconnects (e.g., conductive lines) and other components for transmitting data over a physical conductive line. The primary power supply 120 and secondary power supply 122 are power supplies implemented in any technically feasible manner. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method, comprising:
during a time period where a primary power supply is powering a functional element of a device, converting heat energy generated by the device into electrical energy via thermocouples thermally coupled to a heat sink of the device and electrically coupled to a secondary power supply, to charge the secondary power supply;
in response to a trigger to power the functional element of the device to a lower power state and in response to stored energy of the secondary power supply being above a threshold, operating a set of backup state elements for the functional element in a lower power mode, in which the set of backup state elements are powered by the secondary power supply; and
resuming operation of the functional element and the backup state elements in a higher power mode,
wherein a power status of the backup state elements is dependent on whether the backup state elements are operating in the higher power mode or the lower power mode.

2. The method of claim 1, wherein:
in the higher power mode, the backup state elements are powered by a primary power supply and not a secondary power supply, and in the lower power mode, either: (1) the backup state elements are powered by the secondary power supply and not the primary power supply; or (2) the backup state elements are powered off.

3. The method of claim 1, wherein operating the set of backup state elements for the functional element in the lower power mode comprises maintaining the backup state elements in a powered on state by switching a power supply for the backup state elements from a primary power supply to the secondary power supply.

4. The method of claim 3, wherein switching the power supply occurs in response to the trigger.

5. The method of claim 3, wherein switching the power supply includes saving state of the backup state elements to a backup memory.

6. The method of claim 3, wherein resuming operation of the backup state elements in the higher power state comprises restoring power from the primary power supply to the backup state elements.

7. The method of claim 3, further comprising charging the secondary power supply using ambient energy collection other than the heat energy.

8. A system, comprising:
a functional element;
a set of backup state elements of the functional element; and
a power state controller configured to:
during a time period where a primary power supply is powering a functional element of a device, convert heat energy generated by the device into electrical energy via thermocouples thermally coupled to a heat sink of the device and electrically coupled to a secondary power supply to charge the secondary power supply;
in response to a trigger to power the functional element to a lower power state and in response to stored energy of the secondary power supply being above a threshold, operating the set of backup state elements for the functional element in a lower power mode, in which the set of backup state elements are powered by the secondary power supply; and
resuming operation of the functional element and the backup state elements in a higher power mode,
wherein a power status of the backup state elements is dependent on whether the backup state elements are operating in the higher power mode or the lower power mode.

9. The system of claim 8, wherein:
in the higher power mode, the backup state elements are powered by a primary power supply and not a secondary power supply, and in the lower power mode, either: (1) the backup state elements are powered by the secondary power supply and not the primary power supply; or (2) the backup state elements are powered off.

10. The system of claim 8, wherein operating the set of backup state elements for the functional element in the lower power mode comprises maintaining the backup state elements in a powered on state by switching a power supply for the backup state elements from a primary power supply to the secondary power supply.

11. The system of claim 10, wherein switching the power supply occurs in response to the trigger.

12. The system of claim 10, wherein switching the power supply includes saving state of the backup state elements to a backup memory.

13. The system of claim 10, wherein resuming operation of the backup state elements in the higher power state comprises restoring power from the primary power supply to the backup state elements.

14. The system of claim 10, further comprising charging the secondary power supply using ambient energy collection other than the heat energy.

15. A non-transitory computer-readable medium storing instructions that, when executed by a processor, cause the processor to perform operations comprising:

during a time period where a primary power supply is powering a functional element of a device, converting heat energy generated by the device into electrical energy via thermocouples thermally coupled to a heat sink of the device and electrically coupled to a secondary power supply, to charge the secondary power supply;

in response to a trigger to power the functional element of the device to a lower power state and in response to stored energy of the secondary power supply being above a threshold, operating a set of backup state elements for the functional element in a lower power mode, in which the set of backup state elements are powered by the secondary power supply; and resuming operation of the functional element and the backup state elements in a higher power mode, wherein a power status of the backup state elements is dependent on whether the backup state elements are operating in the higher power mode or the lower power mode.

16. The non-transitory computer-readable medium of claim 15, wherein:

in the higher power mode, the backup state elements are powered by a primary power supply and not a secondary power supply, and in the lower power mode, either: (1) the backup state elements are powered by the secondary power supply and not the primary power supply; or (2) the backup state elements are powered off.

17. The non-transitory computer-readable medium of claim 15, wherein operating the set of backup state elements for the functional element in the lower power mode comprises maintaining the backup state elements in a powered on state by switching a power supply for the backup state elements from a primary power supply to a secondary power supply.

18. The non-transitory computer-readable medium of claim 17, wherein switching the power supply occurs in response to the trigger.

19. The non-transitory computer-readable medium of claim 17, wherein switching the power supply includes saving state of the backup state elements to a backup memory.

20. The non-transitory computer-readable medium of claim 17, wherein resuming operation of the backup state elements in the higher power state comprises restoring power from the primary power supply to the backup state elements.

* * * * *